United States Patent Office 3,426,683
Patented Feb. 11, 1969

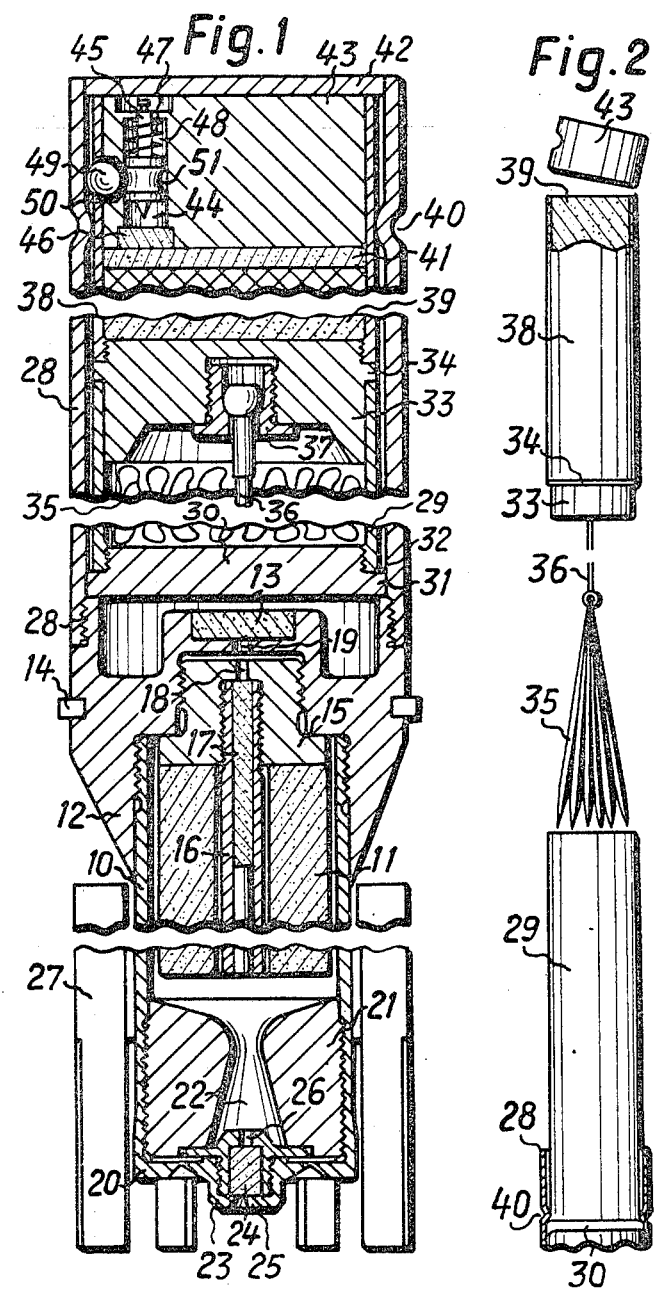

3,426,683
STAR SHELL
Hanspeter Schenk, Hargen, and Robert Apotheloz, Wallisellen, Switzerland, assignors to Oerlikon-Buhrle Holding Ltd., Zurich, Switzerland
Filed July 19, 1967, Ser. No. 654,491
Claims priority, application Switzerland, July 20, 1966, 10,497/66
U.S. Cl. 102—34.1     9 Claims
Int. Cl. C06d 1/04; F42b 13/38, 13/40

ABSTRACT OF THE DISCLOSURE

A star shell having a first sleeve in which is located an illuminating body and a second sleeve wherein there is accommodated a parachute secured to the first sleeve. Both sleeves are located in a casing. A charge for ejecting both sleeves out of the casing and for withdrawing the parachute out of its sleeve is located in the casing behind the two sleeves. A shoulder on the second sleeve and a bead on the casing prevent complete ejection of one of the two sleeves out of the casing.

---

The invention concerns a star shell, in particular a star shell with a propellant charge and with a parachute.

An object of the invention is the provision of a star shell having a parachute which opens reliably and is not obstructed by the air resistance at the opening.

A further object of the invention is the provision of a star shell wherein the illuminating body can be ignited in front in the nose, without it being necessary to arrange for a hitherto-used time fuze, which requires a device which starts off the fuze, for example through the acceleration on discharge, also a safety in transport fitting which prevents an unintentional, premature setting off of this device, e.g. by careless handling in transport.

A still further object of the invention is the provision of a star shell with the greatest possible illuminating surface, which is not reduced by an axial hole in the illuminating body.

With the above and other objects in view which will become apparent from the detailed description below, one form of the invention is shown in the drawings, in which:

FIGURE 1 is a longitudinal sectional view through the star shell with portions broken away.

FIGURE 2 is a view partially in section and partially in elevation illustrating the position of the elements after the illuminating body and parachute have been ejected from a rear sleeve.

In accordance with FIGURE 1, a rocket propellant charge 11 is located in a tube 10. The tube 10 is screwed into a headpiece 12, in which an ejector charge 13 is located. In the headpiece 12 moreover, on the outside, are provided two diametrically opposite twist studs 14, which project into corresponding helical grooves in the discharge tube (not shown), when the star shell is located in the discharge tube.

At the inside of the headpiece 12 is securely screwed a socket 15, to which the rocket propellant charge 11 is secured. A small tube 16, which passes through the rocket propellant charge 11, is screwed at one end into the socket 15, and contains in this end a pyrotechnic delay charge 17. This pyrotechnic delay charge 17 is in working communication with the ejector charge 13 through a hole 18 in the socket 15 and a further hole 19 in the headpiece 12. The tube 10, in which the rocket propellant charge 11 is located, is closed by a cover 20 at its end opposite to the headpiece. In this end of the tube 10, a body 21 is provided, which has a hole 22, at first contracting and then expanding sharply.

A further pyrotechnic delay charge 24 is provided in a casing 23 in the cover 20. The casing 23 has a first hole 25 for ignition of the delay charge 24, also a second hole 26, through which the delay charge 24 is connected through the hole 22 both with the rocket propellant charge 11 and with the first-mentioned delay change 17. The casing 23 is attached by a predetermined breaking place to the cover 20. On ignition of the rocket propellant charge 11, the casing 23 is ejected to the rear by gas pressure, since the casing 23 is disconnected from the cover 20 at the predetermined breaking place.

Stabilizing fins 27 are provided on the outside of the tube 10.

A forward-projecting casing 28 of the star shell is connected to the headpiece 12. A sleeve 29, the outside diameter of which is less than the inside diameter of the casing 28, is securely connected to a disc 30 located opposite the front surface of the headpiece 12. A flange 31 of the disc 30 serves for its guidance in the casing 28 and forms a ring-shaped shoulder 32. A disc 33, fitted into the sleeve 29 from the front end, is supported by a ring-shaped shoulder 34 on the front surface of the latter.

A parachute 35 is loosely packed in the sleeve 29 and a cord 36 secured to it is connected to a sleeve 37 inserted in the disc 33. A body 39, consisting of illuminating composition, is secured in a light alloy sleeve 38, the outside diameter of which is the same as that of the sleeve 29 containing the parachute and is firmly connected to the disc 33, projecting forwardly from the latter. A bead 40, running round the whole circumference of the casing 28 and projecting into the latter, serves for guidance of the sleeve 38, and a priming charge 41 is arranged in front of the front surface of the illuminating body 39. A cover 42, inserted in the casing 28, fits against the front face of the sleeve 38.

A device, serving for the ignition of the illuminating body 39, is mounted in a cylindrical body 43 which is arranged between the rear face of the cover 42 and the priming charge 41 and secured to the sleeve 38. In a hole 44, lying parallel to the shell axis, in this intermediate member is inserted an ignition pin 45, the point of which is directed towards a primer pellet 46, arranged in this hole 44, spatially connected to the priming charge 41. The ignition pin 45, under the pressure of a spring 47 supported against a ledge 48 in the hole 44, is secured by a blocking body constructed as a ball 49. This ball 49 is arranged in a hole 50, radially from the surface of the sleeve 38 into the intermediate member 43, and rests on one side against the inside wall of the casing 28 and furthermore engages in a groove 51 on the shaft of the ignition pin 45.

The operation of the star shell is as follows:

On discharge of the star shell from the launcher tube, not shown, the pyrotechnic delay charge 24 is ignited in known manner, not further described here. As soon as the star shell is about 15 metres distant from the launcher tube, through the delay charge 24, the rocket propellent charge 11 is also ignited, which burns for about half a second and drives the star shell. Simultaneously with the rocket propellant charge 11, the delay charge 17, located in the small tube 16, is also ignited by the delay charge 24. About eight (8) seconds after being ignited, this delay charge 17 ignites the ejector charge 13.

The gases from this ejector charge 13 now act on the disc 30 of the sleeve 29 and force the latter, and therewith also the disc 33 propelled by the latter, and the sleeve 38 containing the illuminating body 39, forward out of the casing 28. When the shoulder 32 of the disc 30 strikes against the bead 40 arranged at the front end of the casing 28, the sleeve 29 is suddenly checked and then remains connected to the casing 28. The sleeve 38 containing the illuminating body 39, together with the disc 33 connected to it, move on, however, with undiminished velocity and leave the casing after driving out the cover 42, whereby as a result of this relative movement of the illuminating body sleeve 38 in relation to the sleeve 29, the parachute 35 is drawn out of the latter (FIG. 2).

As soon as the ball 49, blocking the ignition pin 45, has passed the front end of the casing 28, it is pressed outwards under the effect of the force of the spring 47 transmitted by the surface of the groove 51 of the ignition pin 45, so that it liberates the ignition pin 45 and the latter can pierce the ignition pellet 46, igniting the charge 41. Under the effect of the burnt gases from the charge 41 acting on the base of the intermediate member 43, the latter is forced away from the sleeve 38 and furthermore the illuminating body 39 is ignited on its front face.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. Star sheel comprising a casing which in the flying direction of the star shell has a front sleeve having a front and a rear end in said casing ejectable from said casing, a rear sleeve having a rear end slidable in said casing, an illuminating body located in said front sleeve, an ignition pin for said illuminating body secured to said front end of said front sleeve, a primer pellet behind said ignition pin, locking means for said pin held in locking position by said casing which releases said pin upon ejection of said front sleeve from said casing, a parachute located in said rear sleeve connected to said front sleeve, an ejector charge arranged behind said two sleeves for driving said front sleeve out of said casing and sliding said rear sleeve forwardly within said casing, a propellant charge for firing said shell behind said ejector charge, a first delay charge for igniting said ejector charge and a second delay charge for igniting said propellant charge simultaneously with said first delay charge.

2. Star shell as set forth in claim 1 comprising an igniter pin holding strut secured at the front end of said front sleeve containing said ignition pin and spring means in said holding strut urging said pin towards said primer pellet for igniting said illuminating body.

3. Star shell as set forth in claim 2 comprising a priming charge located between said holding strut at the front of said sleeve and said illuminating body, said priming charge being ignited by said primer pellet whereby said priming charge ignites said illuminating body and ejects said holding strut out of said front sleeve.

4. Star shell as set forth in claim 1 comprising means for preventing the ejection of said rear sleeve from said casing.

5. Star shell as set forth in claim 1 comprising a tube passing through said propellant charge, said tube containing said first delay charge, said first delay charge being connected with said ejector charge and said second delay charge being connected with said propellant charge and with said first delay charge.

6. Star shell as set forth in claim 5 comprising a second tube which is venturi shaped and arranged coaxially to said first tube, said second tube containing said second delay charge.

7. Star shell as set forth in claim 1 comprising a first disc at the rear end of said front sleeve and a cord secured to said parachute secured to said first disc.

8. Star shell as set forth in claim 7 comprising a third sleeve secured to said first disc centrally thereof to which said cord is centrally anchored.

9. Star shell as set forth in claim 7 comprising a second disc at the rear end of said first disc having a flange guiding said rear sleeve in said casing, said flange projecting radially about said front sleeve.

References Cited

UNITED STATES PATENTS

| | | | |
|---|---|---|---|
| 2,198,697 | 4/1940 | Driggs | 102—35.6 X |
| 2,503,269 | 4/1950 | Hickman | 102—34.4 X |
| 2,519,123 | 8/1950 | Dwyer et al. | 102—34.4 X |
| 2,785,632 | 3/1957 | Clauser et al. | 102—37.6 |
| 2,845,866 | 8/1958 | Jasse | 102—80 |
| 3,263,611 | 8/1966 | Loken | 102—82 |

ROBERT F. STAHL, *Primary Examiner.*

U.S. Cl. X.R.

102—34.4, 35.6, 37.6